United States Patent [19]

Chang

[11] Patent Number: 5,951,681
[45] Date of Patent: Sep. 14, 1999

[54] METHOD AND DEVICE OF PLUGGING AND IMMEDIATELY PLAYING A CPU

[75] Inventor: Chen-Yu Chang, Jung He, Taiwan

[73] Assignee: Micro-Star International Co., Ltd., Taipei, Taiwan

[21] Appl. No.: 08/980,616

[22] Filed: Dec. 1, 1997

[51] Int. Cl.[6] .................................................. G06F 13/10
[52] U.S. Cl. ........................ 713/1; 713/300; 713/322; 713/340; 713/501; 713/600; 713/601
[58] Field of Search ............................ 395/651, 750.01, 395/750.03, 750.07, 556, 559, 560; 713/300–322, 340, 501, 600, 601

[56] References Cited

U.S. PATENT DOCUMENTS

| | | | |
|---|---|---|---|
| 5,487,181 | 1/1996 | Dailey et al. | 455/89 |
| 5,532,935 | 7/1996 | Ninomiya et al. | 364/492 |
| 5,613,135 | 3/1997 | Sakai et al. | 395/800 |
| 5,754,798 | 5/1998 | Uehara et al. | 395/284 |

*Primary Examiner*—Joseph E. Palys
*Assistant Examiner*—Omar A. Omar

[57] ABSTRACT

A method and device of plugging and immediately playing a CPU. The user sets the settings of working frequency and voltage of the CPU through the system firmware of a computer. Then, the system stores the settings in a storage device, and the CPU is reset by a reset unit, thereby the multiple frequency controller and voltage converter take control of the operation to instruct the CPU to determine the working speed by a new multiple frequency ratio and to change the voltage into a working voltage corresponding to the model and brand of the CPU without the use of jumpers or switches. The goal of plugging and immediately playing of a CPU is achieved.

13 Claims, 7 Drawing Sheets

METHOD AND DEVICE OF PLUGGING AND IMMEDIATELY PLAYING A CPU

FIELD OF THE INVENTION

This invention relates to a method and device of plugging and immediately playing a CPU, and particularly to a method and device by which a computer system generates a working frequency and voltage which are correspondent to those of the CPU, through settings on a system firmware in order to plug and immediately play the CPU.

BACKGROUND OF THE INVENTION

The CPU manufacturers all around the world, such as Intel, Cyrix, AMD, etc., make CPUs having special specifications which are set by the manufacturers. Because the CPUs do not have a standard specification therebetween, the methods of generating the CPU working frequencies are different. For example, the method of generating the working frequency of Intel 200 is to multiply 66.667 MHz with 3. The working frequency of Cyrix 200 is obtained by multiplying 75 MHz with 2. The working voltages of all the CPUs made by the same manufacturer are not the same. For example, the working voltage of Intel P54C is 3.3 volts, and P55X is 2.8 volts. The working voltage of Cryix 6X86 is 3.5 volts, while 6X86L is 2.8 volts and 6X86MX is 2.9 volts. The working voltage of AMD K5 is 3.3 volts, while K6 is 2.9 volts or 3.2 volts. The working voltage of K6 which will be available is 2 volts. Because the mother board manufacturers do not know that the users will buy what kind of CPU before the users tell it to them, thus, the available mother boards should have the function of regulatively matching the CPU which is chosen by the user. In the well-known methods, the matching of working frequency is done by changing a CPU multiple frequency coefficient signal and a frequency selection signal of the frequency generator by means of jumpers or switches. In the same way, the working voltage to be provided to the CPU is changed. However, the users are not familiar with the matching methods. Although a user manual for guidance may be provided, the user cannot easily set the jumper or switch. It is difficult and inconvenient for the user to do so. If the setting of the jumper or switch is wrong, the CPU is broken down or the optimum working state of the CPU cannot be set and obtained.

In view of the above drawbacks, several mother board manufacturers proposed some methods to overcome such a problem. For example, Taiwanese Patent Publication No. 297872 discloses a method and device of switching a working frequency of a computer mother board. Taiwanese Patent Publication No. 304239 discloses a method and device of automatically setting a power voltage of a CPU on a mother board. In Taiwanese Patent Publication No. 297872, by means of settings similar to those of mother board BIOS, the CPU multiple frequency coefficient and external working frequency are set by the user directly on the monitor screen. For example, the working frequency of Intel 200 series CPUs is 200 MHz which is obtained by multiplying a base frequency 66.667 MHz with a multiple frequency coefficient 3. The users of Taiwanese Patent Publication No. 297872 set the base frequency and multiple frequency coefficient on the monitor screen, then a computer system can automatically generate the working frequency needed by the CPU through the settings. However, most of the users are not familiar with the computer hardware structure. When the user buys the computer, he generally instructs the model, such as Pentium PRO 200, to be bought. The numeral 200 represents the working frequency of the CPU. Therefore, the users only know this number and do not know the base frequency and the multiple frequency coefficient. The settings will bother the user. The user probably incorrectly takes the base frequency to be the working frequency. When it happens, the system boots at low speed, and when the CPU receives the incorrect settings, the computer probably cannot normally run or the CPU breaks down. Furthermore, the settings of the working frequencies of various CPUs are different, the working voltages are different too. The first Taiwanese patent provides a method of automatically setting the working frequency, but the method of using the different CPU working frequencies is not provided. The goal of plugging and immediately playing the CPUs can not be achieved.

In the second Taiwanese patent, at the location of the jumper on the mother board, a switch is connected in parallel. The voltage levels of the working voltage pin VCC2-DET defined by the CPU respectively represent the using range of working voltage. The pin controls the switch-on or switch-off state of each switch in order to automatically set the working voltage needed by the CPU. However, the switching and settings are made to change between 3.3 volts and 2.8 volts, and cannot meet the requirements of all kinds and models of CPUs. In the second Taiwanese patent, the settings are made in view of working voltage only and the working frequency of CPU is not changed. Therefore, the goal of plugging and immediately playing cannot be achieved.

SUMMARY OF THE INVENTION

It is an object of the present invention to provide a method and device of plugging and immediately playing a CPU by the user's settings of the working frequency and voltage of the CPU through the system firmware of the computer. The computer system stores the setting data in the storage device and resets the CPU by means of the reset unit in order to let the multiple frequency controller and voltage converter take control of the operation, to instruct the CPU to determine the working speed by a new multiple frequency ratio and to determine the working voltage of the CPU corresponding to the brand and model of the CPU. The determination is not done by switching a jumper or a switch to achieve the goal of plugging and immediately playing a CPU.

It is another object of the present invention to provide an automatic detection function used to prevent the old working frequency and working voltage from destructing the new CPU after the old CPU is removed from the CPU socket and a new different CPU is inserted onto the CPU socket. The common grounding pin of the CPU socket is connected to a detection unit which can detect whether the CPU has been removed from the socket. The state of the CPU (removed or inserted) is stored in a state storage unit. When the computer system is booted, the state of the CPU is detected so as to determine whether the old setting state data is maintained or not. If the state is changed, when the computer system is booted, a warning message is shown to the user. Then, the user can set the state settings anew to maintain the stability of the computer system and to prevent the incorrect settings from destroying the CPU.

It is another object of the present invention to provide an overrating voltage protection device used to prevent the high voltage of the system power from being directly applied to the CPU. The overrating voltage protection device controls the soft switch pin of an ATX power supply so that, when an improper voltage is generated on the computer, the soft switch forces the computer to turn off in order to prevent the breaking-down of the CPU by the improper high voltage.

DETAILED DESCRIPTION OF THE INVENTION

Figure 2:
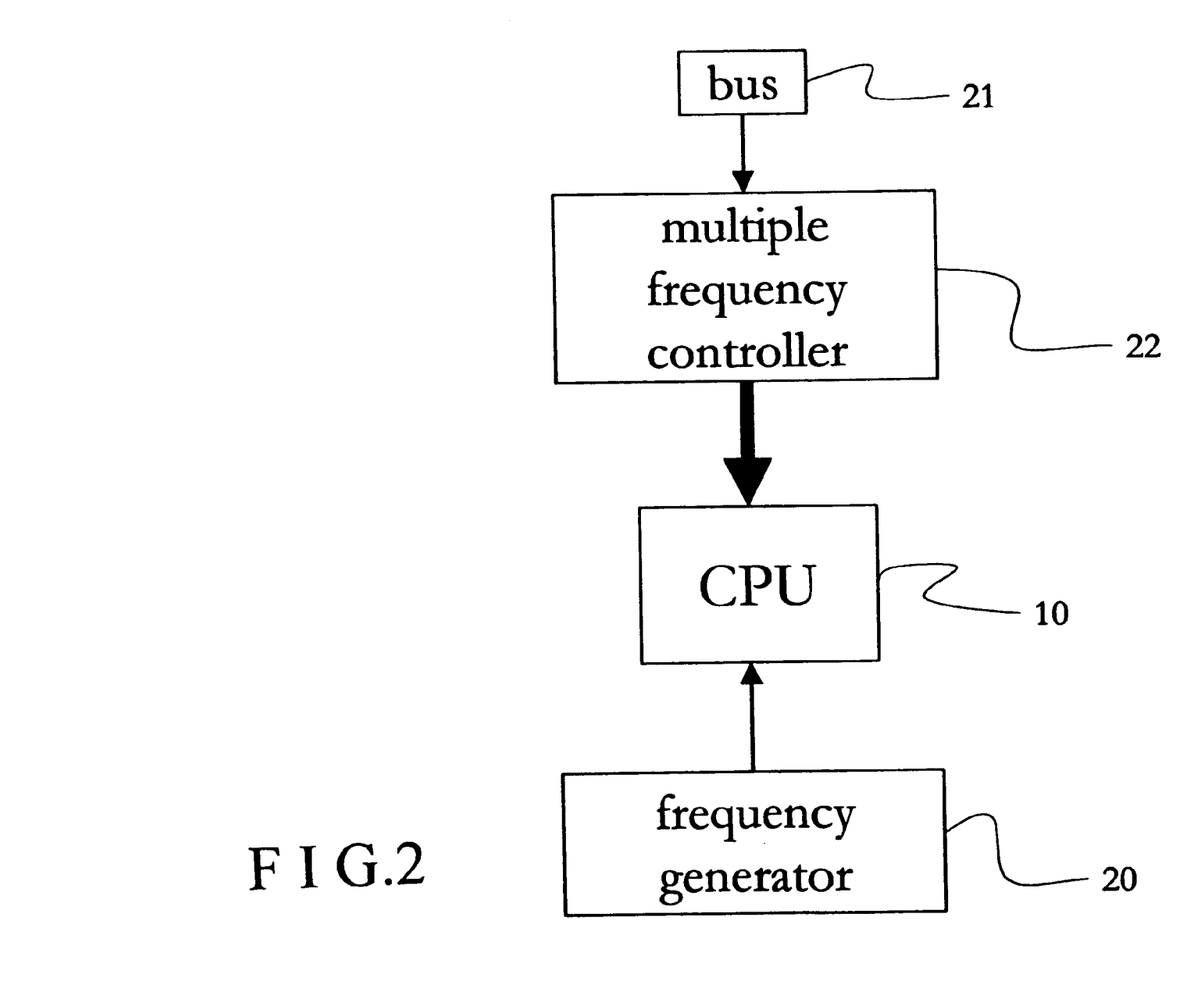
FIG. 2 is a block diagram of the frequency portion of the present invention.
Figure 3:
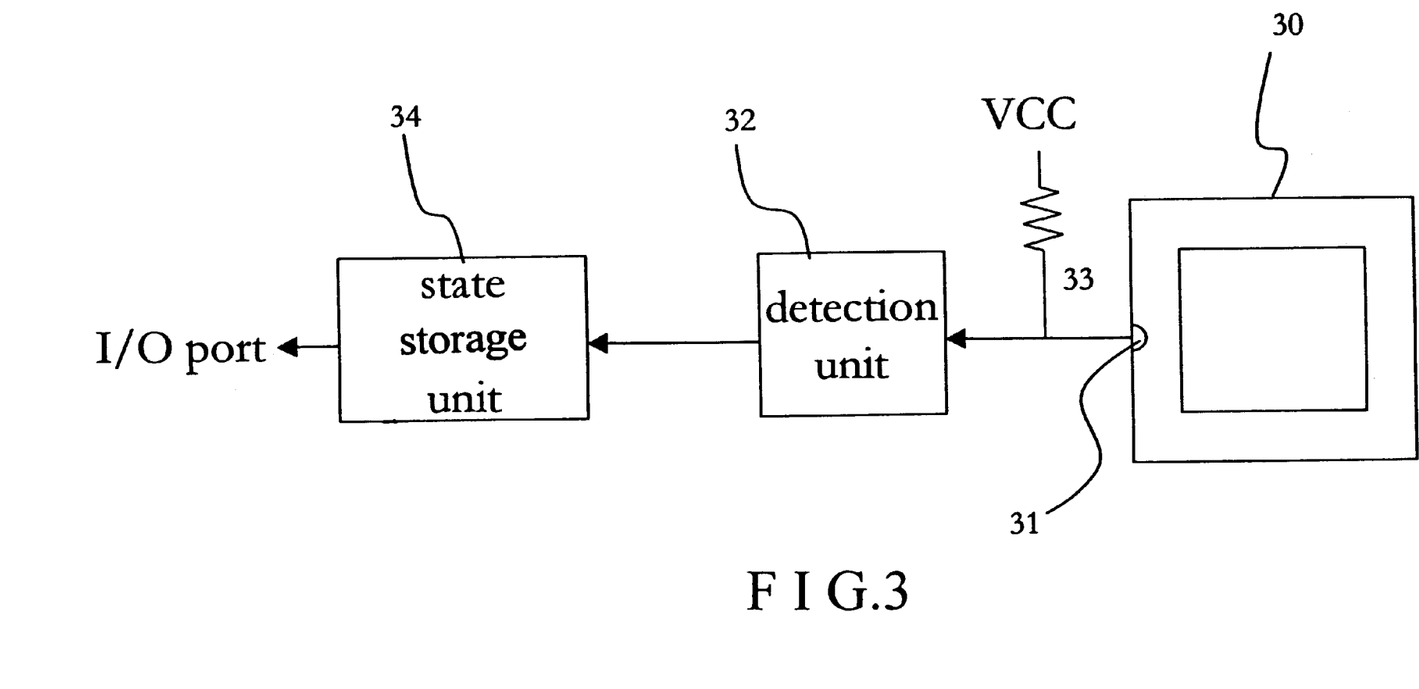
FIG. 3 is a block diagram of the detection portion of the present invention.
Figure 4:
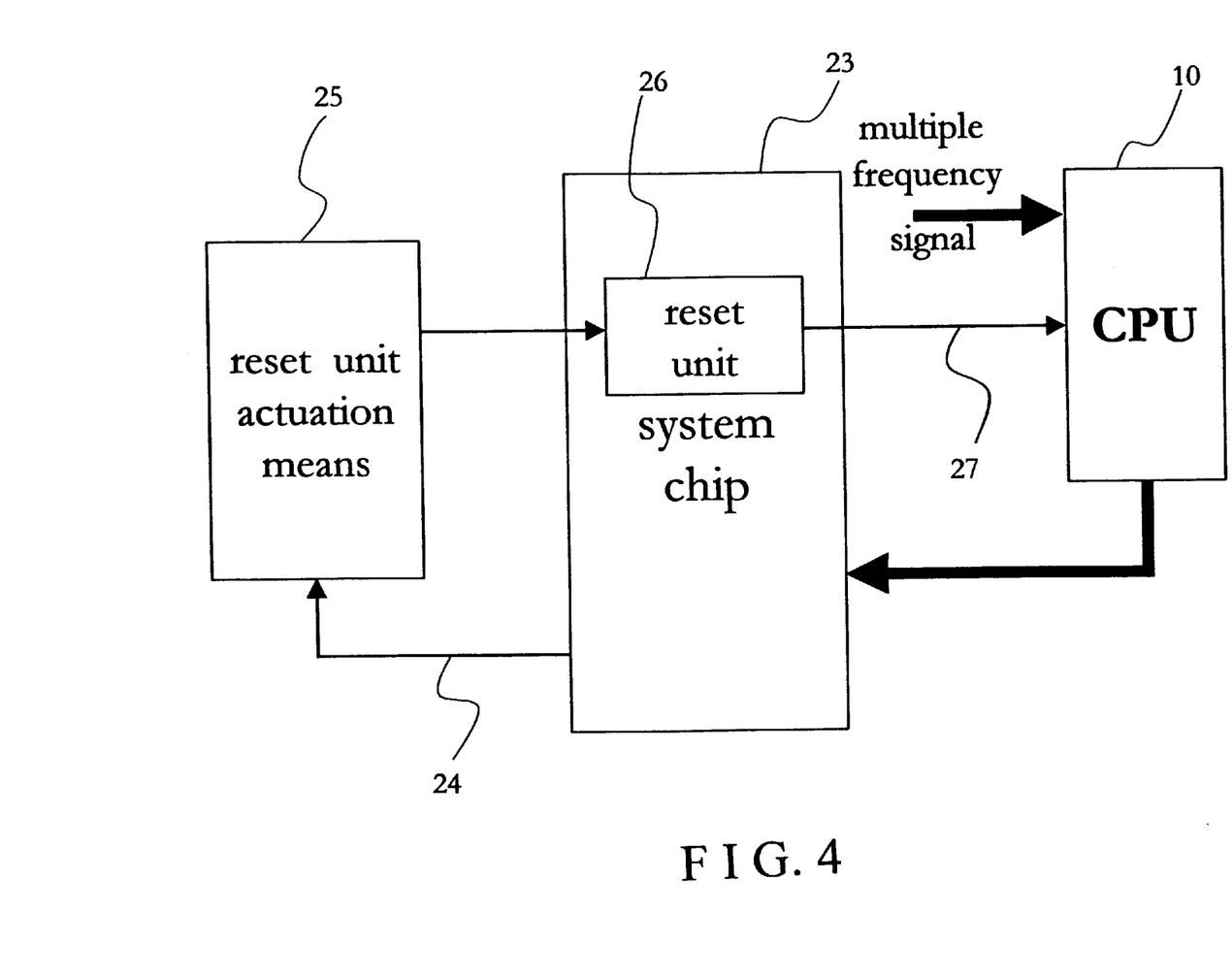
FIG. 4 is a block diagram of the reset unit of the present invention.

In order to achieve the goal of plugging and immediately playing, the technical means of the present invention is to provide the settings in the system firmware (BIOS) set by the user according to the species of the CPU. The settings include two portions, i.e., the working frequency portion and working voltage portion, for a specific CPU. In order to explain the device of the present invention in detail and conveniently, the integral block diagram of the circuit (FIG. 7) is divided into a voltage portion (FIGS. 1, 5 and 6) and a working frequency portion (FIGS. 2, 3, and 4).

Figure 1:
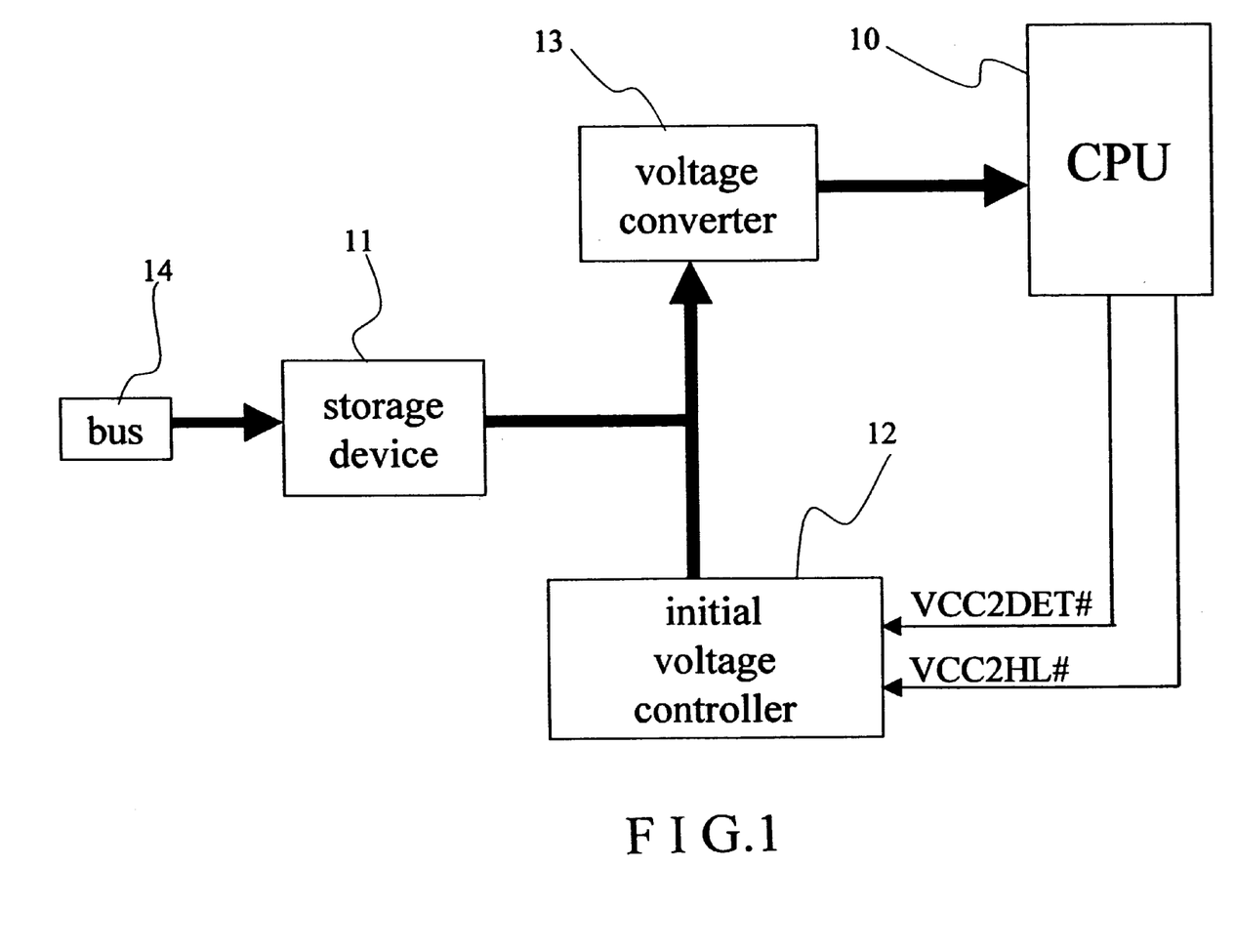
FIG. 1 is a block diagram of the voltage control portion of the present invention.
Figure 7:
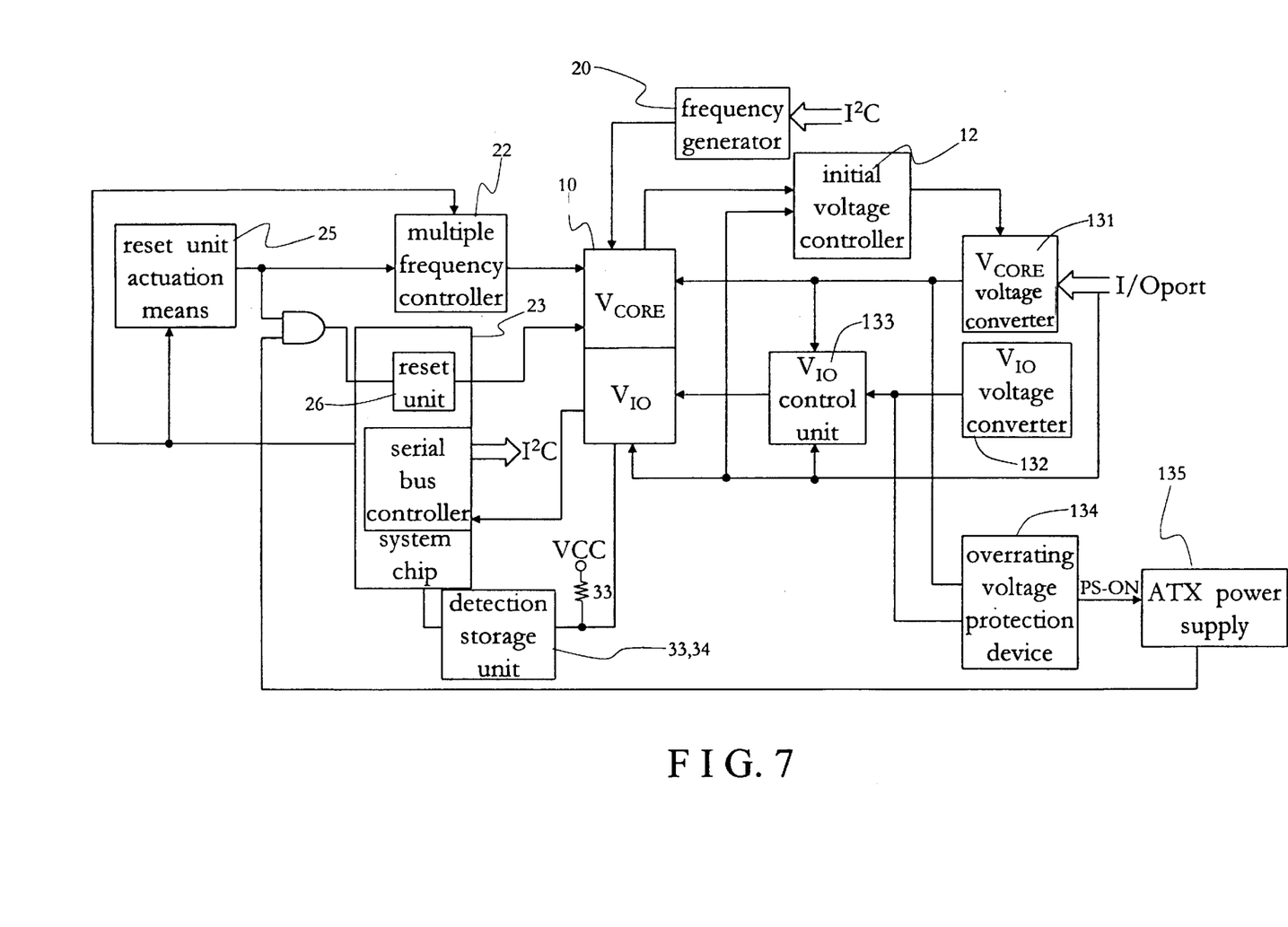
FIG. 7 is an integral block diagram of the present invention.

As shown in FIGS. 1 and 7, the power pins VCC2DET# and VCC2HL# defined by the CPU 10 are used to control the voltage. The working voltage portion comprises a storage device 11, an initial voltage controller 12 and a voltage converter 13. The power pins VCC2DET# and VCC2HL# are connected to the initial voltage controller 12 to output an initial voltage to the voltage converter 13 so that the computer can boot. After the computer system boots and uses the working voltage set by the system firmware, via a bus 14 the system firmware transmits the setting voltage to the storage device to store the state set by the user. After the CPU 10 is reset, the voltage converter 13 changes the initial voltage to the working voltage needed by the CPU 10 according to the setting voltage.

Figure 5:
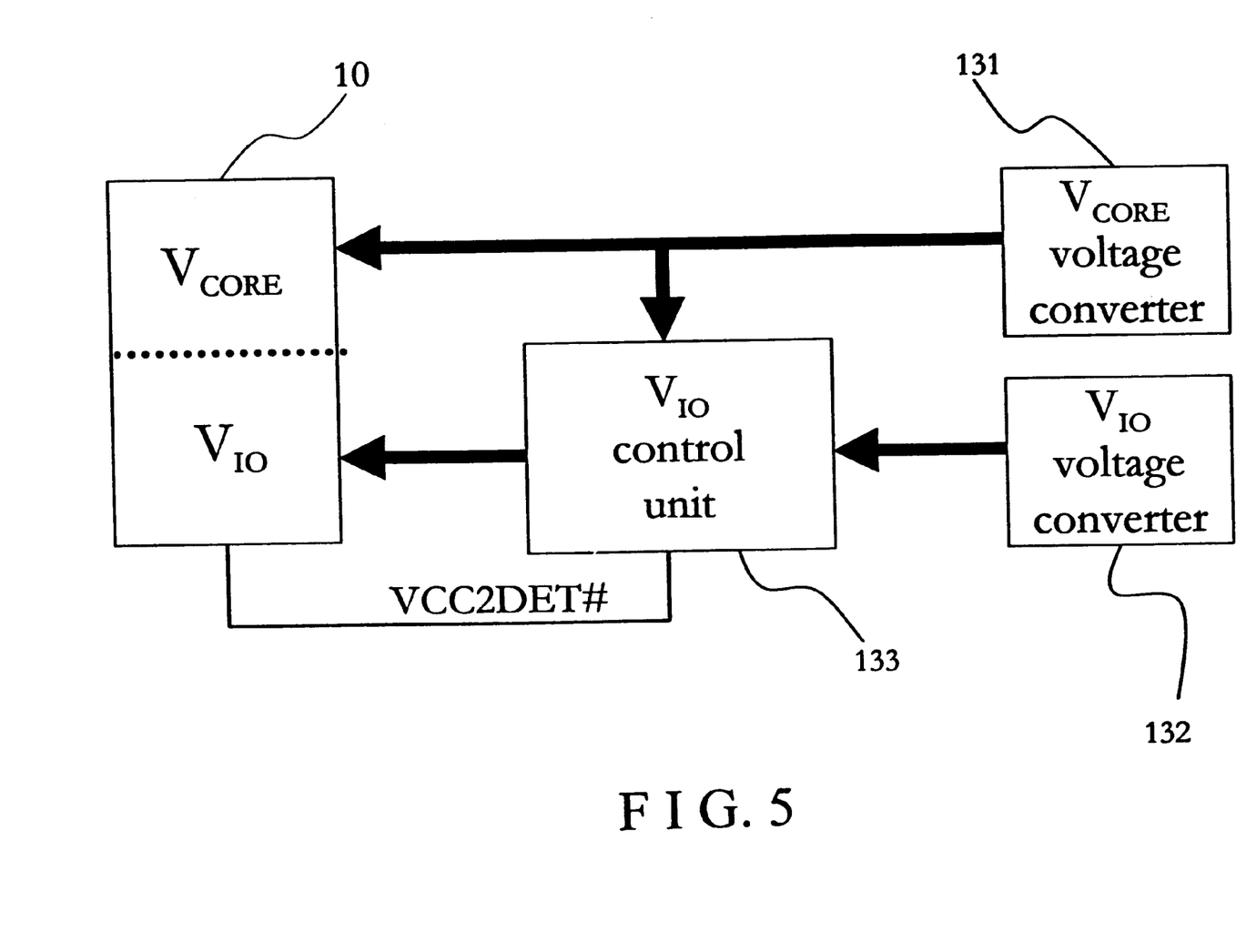
FIG. 5 is a block diagram of the voltage converter of FIG. 2.

As shown in FIG. 5, the working voltage needed by the CPU 10 is divided into $V_{CORE}$ and $V_{IO}$. The $V_{CORE}$ is the working voltage needed in operating the CPU 10. $V_{IO}$ is the voltage used to control peripheral devices. The voltage $V_{CORE}$ and $V_{IO}$ are determined based on the species of the CPU. The voltage converter 13 includes a $V_{CORE}$ voltage converter 131 and a $V_{IO}$ voltage converter 132 for changing the setting voltage to a corresponding working voltage needed by the CPU 10. According to information provided by the CPU manufacturers, the $V_{CORE}$ and $V_{IO}$ are summarized as follows:

1. For P54C, 6X86 and K5, the voltage $V_{CORE}$ and $V_{IO}$ in the inside of the CPU 10 which are connected therebetween are equal.
2. For P54CTB, the level of $V_{CORE}$ is equal to that of $V_{IO}$ However, in the inside of the CPU 10, the $V_{CORE}$ is not connected to the $V_{IO}$.
3. For P55C, K6, 6X86MX and 6X86L, the level of $V_{CORE}$ is not equal to that of $V_{IO}$.

In the case that the mother board manufacturers do not know the species of the CPU that is mounted on the mother board selected by the user, the mother board should meet the requirements of all species of CPUs 10 in order to achieve the object of plugging and immediately playing the CPU. In the present invention, between the $V_{CORE}$ voltage converter 131 and the $V_{IO}$ voltage converter 132 is a $V_{IO}$ control unit 133 which is controlled by the power pin VCC2DET# defined by the CPU 10 in order to generate a switching function similar to an ON/OFF switch. When the VCC2DET# output is at high level, it represents that the $V_{CORE}$ is equal to the $V_{IO}$. When the VCC2DET# output is at low level, the $V_{CORE}$ is not equal to the $V_{IO}$ so as to meet the requirements of using all species of CPUs having different voltage levels.

Figure 6:
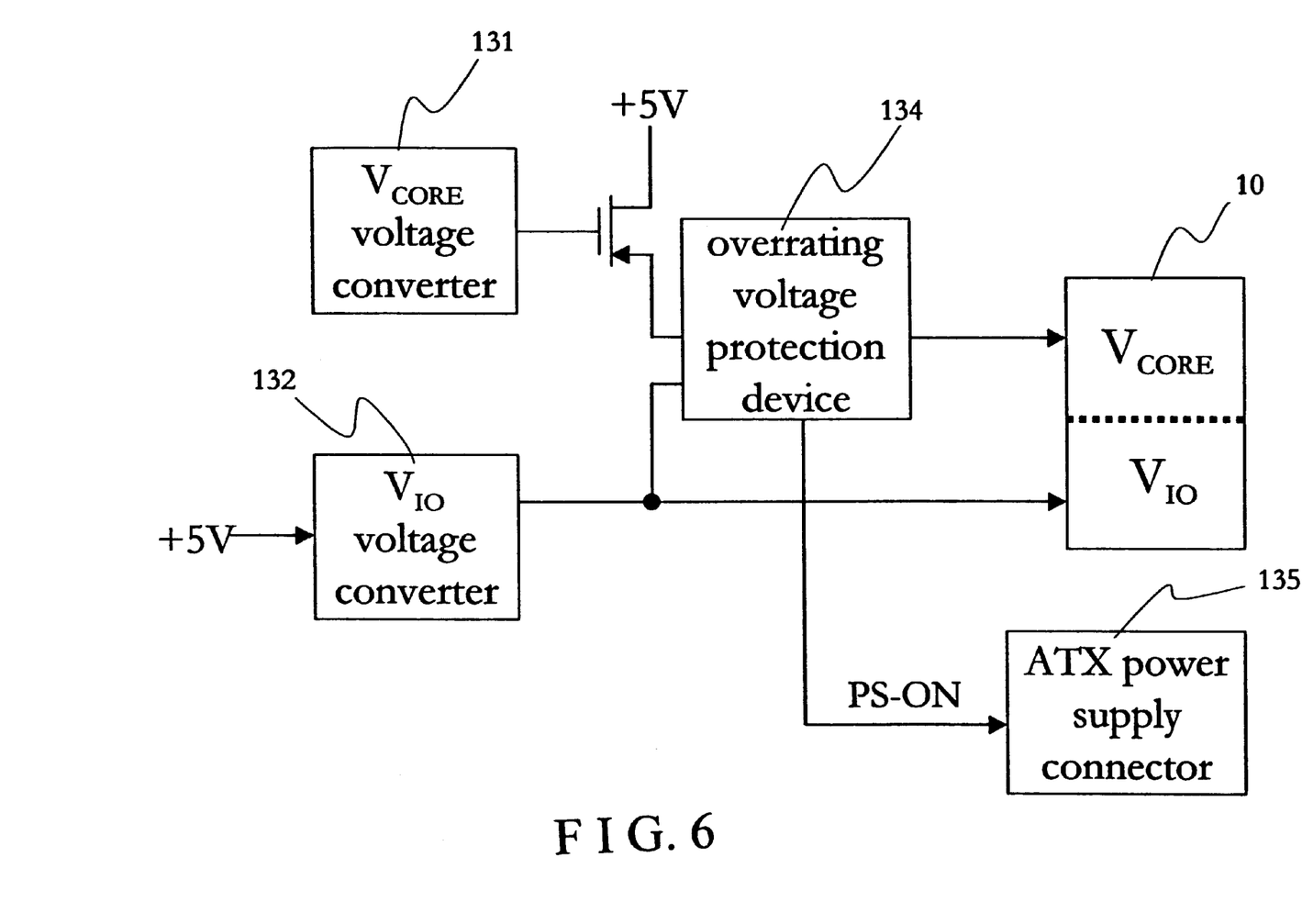
FIG. 6 is a block diagram of the overrating voltage protection device of the present invention.

As shown in FIG. 6, in order to prevent the high voltage of system power supply from being directly applied to the CPU 10 due to the breaking down of the voltage converter 13 and thereby destroying the CPU 10, an overrating voltage protection device 134 is placed between the $V_{CORE}$ voltage converter 131 and the CPU 10. The output of the $V_{IO}$ is connected to the overrating voltage protection device 134. The output of the overrating voltage protection device 134 and the output of the $V_{IO}$ voltage converter 132 are respectively connected to the CPU 10 to provide power to the CPU 10. The overrating voltage protection device 134 has a control signal which is connected to the soft switch pin PS-ON of the ATX power supply connector 135. When the level of the soft switch pin PS-ON is high, the ATX power supply forcibly turns off the computer system. By using the above characteristic, when the output voltage of the $V_{CORE}$ voltage converter 131 is normal, the level of the output signal of the overrating voltage protection device 134 is maintained at low level. When the $V_{CORE}$ voltage converter 131 breaks down so that a high voltage enters, the overrating voltage protection device 134 outputs a high level signal to the soft switch pin PS-ON in order to turn off the ATX power supply to forcibly turn off the computer, thereby the input high voltage does not destroy the CPU 10.

As shown in FIGS. 2 and 7, the technical means for changing the working frequency of the CPU 10 of the present invention is to change the frequency of the CPU 10 and to change the multiple frequency ratio. The working frequency is changed by using a frequency generator 20 having a serial bus interface (in the working example of the present invention an I²C is used) through the transmission of the serial bus interface without the use of any external control pin so that the frequency generator 20 can generate different working frequencies to selectively control the output of frequency output pin. When the computer boots, the frequency setting by the system firmware is transmitted to the multiple frequency controller 22 via a bus 21. The output of the multiple frequency controller 22 has a very high output impedance so that the controller 22 does not affect the multiple frequency ratio in the CPU 10. The frequency generated by the frequency generator 20 is input into the phase latch loop (PLL) which is built in the CPU 10. The CPU working frequency having a low frequency is formed by the frequency in association with the multiple frequency ratio which is built in of the CPU 10 to provide to the computer for booting operation. When the user sets the working speed of the CPU 10 through the system firmware, the system firmware stores the setting data in the multiple frequency controller 22. When the CPU 10 is reset again, the multiple frequency controller 22 takes control of the value of the multiple frequency ratio of the CPU 10, and outputs a CPU multiple frequency control signal to the CPU 10. The CPU frequency generated from the frequency generator 20 gives the CPU working speed set by the user in the phase latch loop inside the CPU 10. Then, the CPU 10 takes the working speed changed according to the CPU working speed, as the working frequency. For example, the speed set by the user is the working speed of Intel 200, then the multiple frequency controller 22 changes the built-in multiple frequency ratio to be 3, and the 66.667 MHz frequency generated in the frequency generator 20 is changed and gives a 200 MHz working frequency in the phase latch loop. (3×66.667 MHz=200 MHz)

FIG. 4 relates to a reset unit of the present invention. After the user has set the settings on the system firmware and the set working frequency is generated, the CPU 10 transmits this working frequency to the system chip 23 via a bus. The system chip 23 contains a decoder and stores the working frequency. The decoder decodes the address that stores the working frequency in order to generate a triggering signal 24 which is transmitted via an I/O port to the reset unit actuation device 25 which actuates the reset unit 26 in the system chip 23 in order to give a reset signal 27 transmitted to the CPU 10. When the CPU 10 receives the reset signal 27, the low speed frequency which is originally used to boot, is converted into the working frequency which is set up by the user. Then the step of converting into the working frequency is done.

When the user sets the working frequency and voltage on the system firmware, the computer starts to calculate based on the settings. In other words, if the user does not set them again in the system firmware, the settings in the system firmware are not changed. In some special cases, such as, dismantling, changing the species of, and upgrading of the CPU 10, the computer system does not know that the CPU is replaced by a new one. If the user does not set the setting data again, the working frequency and voltage of CPU 10 will be determined by the old settings. Thus, the computer cannot boot because the frequency setting is too high, or the CPU 10 is broken down because the working voltage is too high. In order to prevent the old working frequency and working voltage from destructing the new CPU 10 after the old CPU is removed from the CPU socket 30 and a new different CPU 10 is inserted onto the CPU socket 30, in the present invention, detection circuit which comprises a detection unit 32 and a sensor is provided. The sensor comprises one pin 31 of the common grounding pins of the CPU socket 30 which is isolated and connected to a detection unit 32, and a resistor 33 which is connected to a power supply VCC. When the old CPU 10 is mounted on the CPU socket 30, because the pin 31 and all the other common grounding pins are grounded, the site of the pin 31 is grounded. When the old CPU 10 is removed from the socket 30, the voltage level of the pin 31 of the socket 30 is increased from grounding voltage to VCC voltage so that the detection unit 32 can detect the state (removed or inserted) of the CPU in order to detect whether the CPU 10 is removed from the socket 30 or is inserted on the socket 30. When the detection unit 32 has detected the state, the state is stored in a state storage unit 34, and is transmitted to the system firmware via an I/O port 35. When the computer system is booted, the state is detected to determine whether the former state data should be abandoned or not. If the state is changed, when the computer system is booted, a warning message is shown to the user. Then, the user can set the state settings anew to maintain the stability of the computer system and to prevent the incorrect setting from destroying the CPU 10. The sensor can further comprise a state storage unit 34.

In conclusion, the present invention provides a method and device of plugging and immediately play a CPU. After the CPU is mounted on the mother board by the user, the working frequency and working voltage of the CPU are directly set on the system firmware without the settings of the jumper in order to achieve the goal of plugging and immediately playing of a CPU. The device of the present invention also provides an overrating voltage protection device for the power supply, and provides protection means for updating the setting data after the CPU is removed from the CPU socket. The method and device of the present invention can maintain the stability of the computer system during changing working frequency and can provide a suitable working voltage based the species of CPU.

While the invention has been particularly shown and described with reference to the preferred embodiments, it will be understood by those skilled in the art that various changes in form and details may be made without departing from the spirit and scope of the invention. Although only the preferred embodiments of this invention were shown and described in the above description, it is requested that any modification or combination that comes within the spirit of this invention be protected.

I claim:

1. A method of plugging and immediately playing a CPU which comprises a working frequency setting procedure and a working voltage setting procedure for setting a working frequency and a working voltage on a system firmware, the working frequency setting procedure comprising the steps of:

changing a frequency by controlling a frequency generator via a bus;

storing a frequency setting in a multiple frequency controller;

resetting the CPU so that the multiple frequency controller takes control of a CPU multiple frequency ratio in order to instruct the CPU to give a new working frequency by the multiple frequency ratio;

and the working voltage setting procedure comprising the steps of:

storing a voltage setting from the system firmware via the bus;

outputting an initial voltage from an initial voltage controller which is controlled by the CPU via a plurality of pins; and converting the initial voltage into the working voltage by means of a control of a voltage converter;

wherein the working frequency and working voltage of the CPU are changed by the frequency and voltage settings.

2. The method of plugging and immediately playing a CPU as claimed in claim 1, wherein after the frequency and voltage settings are set on the system firmware, the CPU is booted by a low frequency according to a built-in multiple frequency ratio.

3. The method of plugging and immediately playing a CPU as claimed in claim 1, wherein according to species and frequency of the CPU set on the system firmware, the base frequency corresponding to the settings is generated and transmitted to the CPU.

4. The method of plugging and immediately playing a CPU as claimed in claim 1, wherein after the CPU receives a base frequency and the multiple frequency ratio, the working frequency corresponding to the settings are set on the system firmware by a user, and after the resetting step, the new working frequency is the working frequency which is used for calculation operation and booting next time.

5. A device of plugging and immediately playing a CPU comprising a working frequency portion and a working voltage portion, wherein the working frequency portion comprising:

a frequency generator having a serial bus interface for changing a frequency via the serial bus and transmitting a changed frequency to the CPU;

a multiple frequency controller which generates and latches a multiple frequency ratio according to a frequency setting set on a system firmware in order to output a multiple frequency signal to the CPU so that the CPU generates a working frequency defined by the system firmware based on the frequency generator and the multiple frequency ratio; and a reset unit which generates a reset signal to the CPU so that an original built-in multiple frequency ratio is replaced by a newly set multiple frequency ratio in order to generate a working frequency corresponding to the frequency setting set on the system firmware, the working voltage portion comprising:

a storage means for storing and latching a voltage setting set on the system firmware and transmitted from a bus;

an initial voltage controller which is controlled by a CPU power control pin, the initial voltage controller outputting an initial voltage to the CPU for booting when the CPU is booted; and a voltage converter which converts the initial voltage into a working voltage according to the voltage setting on the system firmware;

wherein after the frequency and voltage settings are set, the working frequency and voltage of the CPU are changed by the settings so as to achieve the goal of plugging and playing the CPU.

6. The device of plugging and immediately playing a CPU as claimed in claim 5, wherein the reset unit comprises a system chip and a reset unit actuation means, after the settings are set on the system firmware and the working frequency is generated, the CPU transmits this working frequency to the system chip via a bus, the system chip contains a decoder and stores the working frequency, the decoder decodes an address that stores the working frequency in order to generate a triggering signal which, via an I/O port, is transmitted to the reset unit actuation means which actuates the reset unit in the system chip in order to give a reset signal transmitted to the CPU, and when the CPU receives the reset signal, a low speed frequency which is originally used to boot, is converted into the working frequency which is set up by a user.

7. The device of plugging and immediately playing a CPU as claimed in claim 5, wherein the voltage converter comprises a $V_{CORE}$ voltage converter and a $V_{IO}$ voltage converter which respectively convert voltages $V_{CORE}$ and $V_{IO}$ needed by the CPU.

8. The device of plugging and immediately playing a CPU as claimed in claim 7, wherein between the $V_{CORE}$ voltage converter and the $V_{IO}$ voltage converter is a $V_{IO}$ control unit which is controlled by a power pin defined by the CPU in order to generate a switching function and to determine whether the voltage $V_{CORE}$ and $V_{IO}$ interact so as to meet the requirements of using all species of CPUs having different voltage levels.

9. The device of plugging and immediately playing a CPU as claimed in claim 5, wherein the working voltage portion further comprises an overrating voltage protection device to prevent high voltage of a system power supply from being directly applied to the CPU due to breakdown of the voltage converter.

10. The device of plugging and immediately playing a CPU as claimed in claim 9, wherein the overrating voltage protection device is placed between the $V_{CORE}$ voltage converter and the CPU, the overrating voltage protection device has a control signal which is connected to a soft switch pin of an ATX power supply connector, and when the $V_{CORE}$ voltage converter breaks down so that a high voltage occurs, the overrating voltage protection device outputs a high level signal to the soft switch pin in order to turn off the ATX power supply to forcibly turn off the CPU.

11. The device of plugging and immediately playing a CPU as claimed in claim 5, further comprising a detection means for detecting whether the CPU is removed or inserted on a CPU socket and for determining whether the setting set before should be abandoned, wherein the detection means comprises a detection unit and a sensor, and if a CPU state has been changed, the system firmware sends a warning message upon booting so that a user can set the setting anew to maintain the stability of a computer system and to prevent an incorrect setting from destroying the CPU.

12. The device of plugging and immediately playing a CPU as claimed in claim 11, wherein the sensor comprises one sensing pin of common grounding pins of the CPU socket which is isolated and connected to a detection unit and a resistor being connected to a power supply VCC, and by detecting the voltage level of the sensing pin, the CPU state can be determined.

13. The device of plugging and immediately playing a CPU as claimed in claim 12, wherein the sensor further comprises a state storage unit, the detection unit detects the voltage level of the sensing pin and sends the CPU state to the state storage unit, the state storage unit stores the state, and the computer system can detect the CPU state via an I/O port to determine whether the setting set before should be abandoned.

* * * * *